(12) United States Patent
Makabe

(10) Patent No.: US 11,503,448 B2
(45) Date of Patent: Nov. 15, 2022

(54) RADIO COMMUNICATION EQUIPMENT AND CONTROL METHOD THEREOF

(71) Applicant: KYOCERA Corporation, Kyoto (JP)

(72) Inventor: Takeshi Makabe, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 9 days.

(21) Appl. No.: 16/655,137

(22) Filed: Oct. 16, 2019

(65) Prior Publication Data

US 2020/0053541 A1 Feb. 13, 2020

Related U.S. Application Data

(63) Continuation of application No. PCT/JP2018/016138, filed on Apr. 19, 2018.

(30) Foreign Application Priority Data

Apr. 21, 2017 (JP) .............................. JP2017-084187

(51) Int. Cl.
*H04W 4/90* (2018.01)
*H04W 4/40* (2018.01)
*H04M 3/51* (2006.01)
*H04W 8/06* (2009.01)
*H04W 48/18* (2009.01)
*H04W 60/04* (2009.01)

(52) U.S. Cl.
CPC ........... *H04W 4/90* (2018.02); *H04M 3/5116* (2013.01); *H04W 4/40* (2018.02); *H04W 8/06* (2013.01); *H04W 48/18* (2013.01); *H04W 60/04* (2013.01)

(58) Field of Classification Search
CPC ........... H04W 4/90; H04W 4/40; H04W 4/44; H04W 8/06; H04W 48/18; H04W 48/16; H04W 60/04; H04W 76/50; H04W 48/04; H04W 60/005; H04W 24/08; H04M 3/5116
See application file for complete search history.

(56) References Cited

U.S. PATENT DOCUMENTS 9,998,983 B2 * 6/2018 Cui ...................... H04W 48/18
2009/0265543 A1 * 10/2009 Khetawat .............. H04L 63/104
713/151

(Continued)

FOREIGN PATENT DOCUMENTS

EP 3 065 447 A1 9/2016
EP 2632224 B1 * 8/2018 ........... H04L 41/082

(Continued)

*Primary Examiner* — Nizar N Sivji
(74) *Attorney, Agent, or Firm* — Studebaker & Brackett PC

(57) ABSTRACT

A radio communication device installed on a vehicle of this application comprises a radio communicator configured to perform a radio communication with a plurality of networks, a controller configured to perform location registration or a call origination via each of the plurality of networks, and a storage configured to store location registration results or call origination results for each of the plurality of networks. The controller is configured to select a network affording more favorable results than results of one of the plurality of networks based on the location registration results or call origination results stored in the storage, and perform location registration at a time of an emergency call origination by using the selected network.

9 Claims, 6 Drawing Sheets

(56) References Cited

U.S. PATENT DOCUMENTS

| | | | |
|---|---|---|---|
| 2009/0270066 A1 | 10/2009 | Noguchi et al. | |
| 2013/0100930 A1* | 4/2013 | Lee .................... | H04W 60/005 370/331 |
| 2013/0303164 A1 | 11/2013 | Seo | |
| 2014/0099952 A1* | 4/2014 | Bhatnagar ............. | H04W 48/02 455/435.2 |
| 2014/0307623 A1* | 10/2014 | Gheorghiu ............ | H04W 48/18 370/328 |
| 2015/0134193 A1* | 5/2015 | Krueger ................ | G07C 5/008 701/31.5 |
| 2015/0351021 A1* | 12/2015 | Zhang .................. | H04W 48/18 455/432.1 |
| 2016/0212603 A1* | 7/2016 | Chen .................... | H04W 48/14 |
| 2019/0246443 A1* | 8/2019 | Li ........................ | H04W 76/11 |

FOREIGN PATENT DOCUMENTS

| | | | | |
|---|---|---|---|---|
| EP | 3852440 A1 | * | 7/2021 | ............ H04W 48/16 |
| GB | 2004-393706 | * | 6/2004 | .............. H04Q 7/32 |
| JP | 2009-267847 A | | 11/2009 | |
| JP | 2016-167264 A | | 9/2016 | |
| WO | 2007/126100 A1 | | 11/2007 | |
| WO | WO-2009048805 A1 | * | 4/2009 | .......... H04J 11/0093 |
| WO | 2017/038187 A1 | | 3/2017 | |

* cited by examiner

FIG. 4

| PRIORITY LEVEL | NETWORK | LOCATION REGISTRATION RESULT | CALL ORIGINATION RESULT |
|---|---|---|---|
| 1 | R, S | OK | OK |
| 2 | T, U | OK | REJECT(A) |
| 3 | V, W | REJECT(B) | - |
| 4 | X, Y | REJECT(C) | - |
| .... | .... | .... | .... |
| PROHIBITED | Z | REJECT(D) | - |

RADIO COMMUNICATION EQUIPMENT AND CONTROL METHOD THEREOF

RELATED APPLICATIONS

The present application is a continuation based on PCT Application No. PCT/JP2018/016138, filed on Apr. 19, 2018, which claims the benefit of Japanese Patent Application No. 2017-084187 (filed on Apr. 21, 2017). The content of which is incorporated by reference herein in their entirety.

TECHNICAL FIELD

The present invention relates to a radio communication equipment used in an emergency call system and a control method thereof.

BACKGROUND ART

Nowadays, an emergency call system for vehicles called ERA-GLONASS is implemented in Russia. In Europe, the implementation of an emergency call system for vehicles called eCall is scheduled in future. The vehicle emergency call system is a system that automatically makes a report to a nearest police department or fire department through an emergency call center in an emergency, such as a vehicular accident.

For more detailed description, in this emergency call system, a radio communication equipment for telematics installed on an automobile is used. For example, when an automobile encounters a traffic accident and any other accident, the radio communication equipment quickly makes a report to a public safety answering point (PSAP) including an emergency call center.

SUMMARY

A radio communication device installed on a vehicle of this application comprises a radio communicator configured to perform a radio communication with a plurality of networks, a controller configured to perform location registration or a call origination via each of the plurality of networks, and a storage configured to store location registration results or call origination results for each of the plurality of networks. The controller is configured to select a network affording more favorable results than results of one of the plurality of networks based on the location registration results or call origination results stored in the storage, and perform location registration at a time of an emergency call origination by using the selected network.

BRIEF DESCRIPTION OF DRAWINGS

FIG. 4 is a table relating to location registration results and call origination results.

DESCRIPTION OF EMBODIMENTS

The present disclosure provides, in a vehicle emergency call system, a radio communication device and a control method therefor which increase the likelihood of location registration of the radio communication device succeeding at the time the radio communication device makes a call origination to an emergency call center.

In the following, an embodiment will be described with reference to the drawings.

Figure 1:
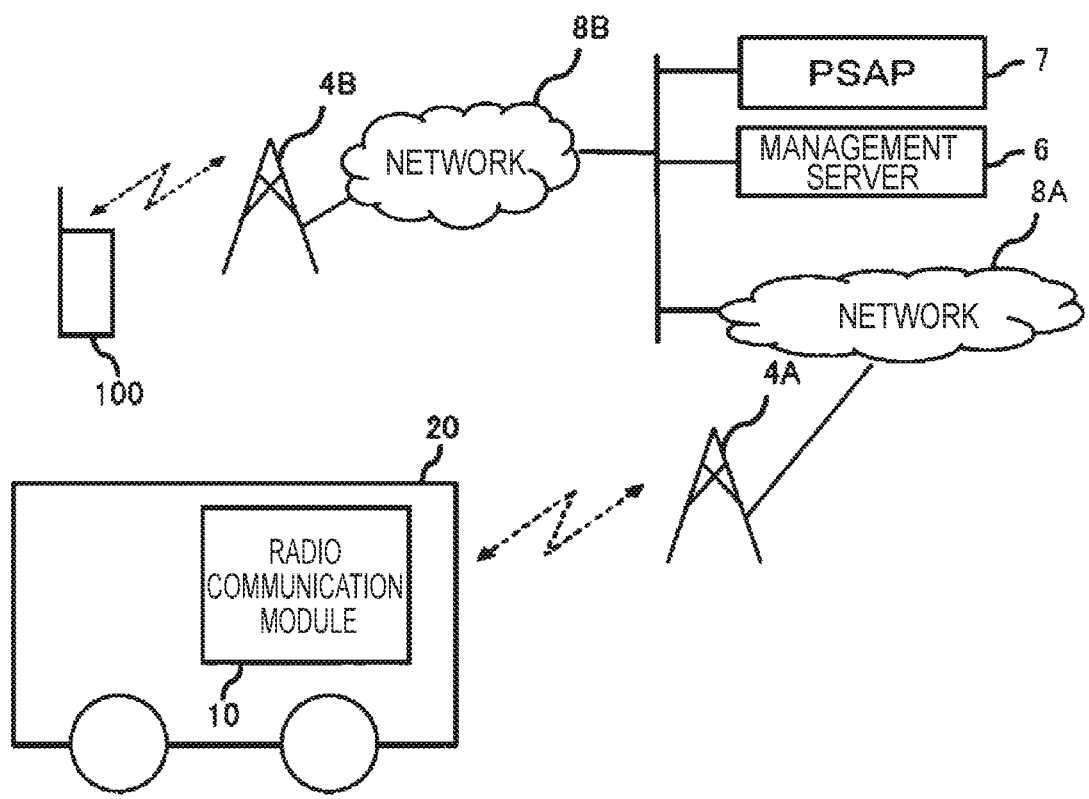
FIG. 1 is a configuration diagram of a radio communications system according to the present embodiment.

FIG. 1 is a block diagram of a radio communication system according to an embodiment. The radio communication system illustrated in FIG. 1 has a vehicle 20 installed with a radio communication module 10, a base station 4A and a base station 4B, a network 8A and a network 8B, a radio terminal 100, a management server 6, and a PSAP 7.

The base station 4A, the base station 4B, the network 8A, and the network 8B are provided by a network operator A. Hereinafter, when the base station 4 or the network 8 is not distinguished for description, the base station 4 or the network 8 is simply described, whereas when the base station 4 or the network 8 is distinguished for description, the base stations 4A and 4B, or the networks 8A and 8B are described.

The base station 4 may cope with any mobile telecommunications systems, including second-generation mobile telecommunications systems, such as global system for mobile communications (GSM) (registered trademark), third-generation mobile telecommunications systems, such as code division multiple access (CDMA), or fourth-generation mobile telecommunications systems, such as long term evolution (LTE).

The radio communication module 10 realizes various functions. For example, the radio communication module 10 makes a call origination to the PSAP 7 (includes an emergency call center) in the event of an emergency in order to realize an emergency call system. In addition, after calling an operator at the PSAP 7, the radio communication module 10 may receive an incoming call from the PSAP 7. The radio communication module 10 may also be capable of making call originations or receiving calls using an IP telephone by means of voiceover internet protocol (VoIP) or the like.

Furthermore, there are known telematics services that provide information services real time in combination of the vehicle 20 with a communication system. In the telematics services, map data and point of interest (POI) data for data updates of a navigation system from a server on the network 8. In the telematics services, diagnostic information on the equipment installed on the vehicle is uploaded to the server on the network 8. The radio communication module 10 performs such downloads and uploads via the network 8.

In the embodiment, the radio communication module 10 is instantiated as an in vehicle system (IVS) installed on a vehicle, such as the vehicle 20. In the embodiment, the vehicle 20 is described as an example of a vehicle. Of course, the vehicle may be any moving transportation, such as ships or trains. The radio communication module 10 may be also installed on portable terminals, such as cellular telephones or smartphones. The radio communication module 10 may be a module for internet of things (IoT).

The radio communication module 10 may cope with second-generation mobile telecommunications systems, third-generation mobile telecommunications systems, or fourth-generation mobile telecommunications systems. The radio communication module 10 may communicate with the radio terminal 100. The radio communication module 10 may have various functions and functions that execute programs created by a user.

The network operator A that manages the base station 4 or the network 8 provides network operator's mobile communications services to users that have concluded a contract with the network operator.

Figure 2:
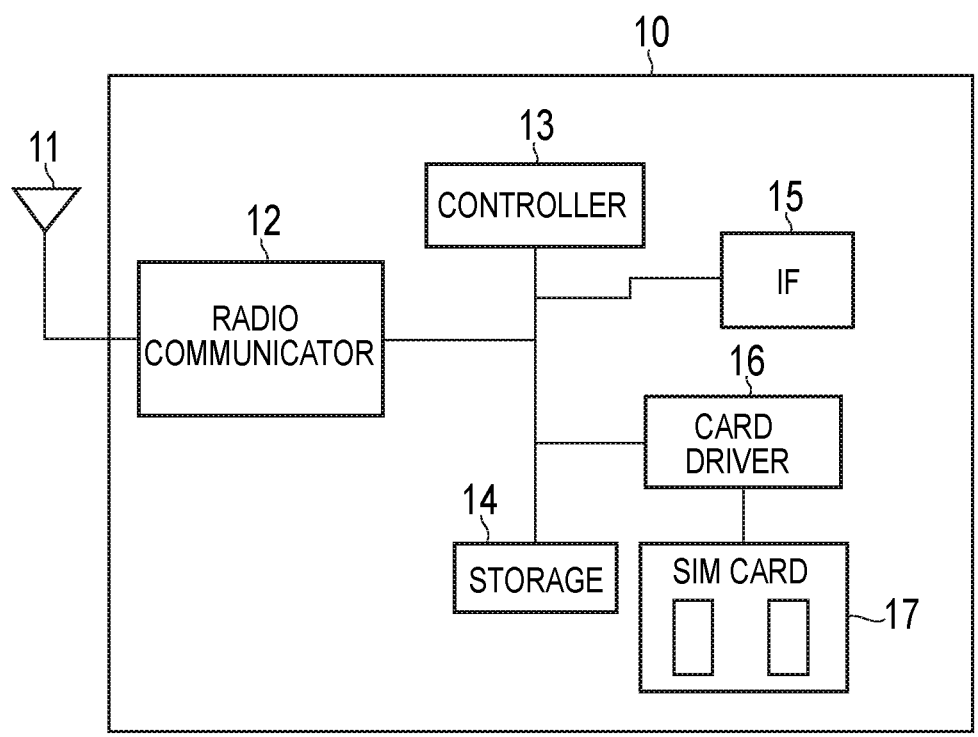
FIG. 2 is a block diagram of a radio communication module according to the present embodiment.

FIG. 2 is a block diagram of the radio communication module according to the embodiment. The radio communication module illustrated in FIG. 2 has an antenna 11, a radio communicator 12, a controller 13, a storage 14, an IF 15, a card driver 16, and a subscriber identity module (SIM) card 17.

The antenna 11 transmits and receives radio signals with the base station 4.

The radio communicator 12 communicates with the base station 4 by radio communication through the antenna 11. The radio communicator 12 has an analog signal processor and a digital signal processor.

The analog signal processor performs amplification, an analog-to-digital conversion process, and any other process of radio signals received from the antenna 11, performs analog amplification, including a digital-to-analog conversion process, of the digital signals transferred from the digital signal processor, and transmits the analog signals through the antenna 11.

The digital signal processor encodes data transferred from the controller 13, and converts the data into digital signals such that the data can be transmitted through the communication channel of radio signals, whereas the digital signal processor decodes the digital signals transferred from the analog signal processor, and transfers the decoded data to the controller 13.

The controller 13 is mainly configured of a microcomputer formed of a central processing unit (CPU) that executes various programs, a read only memory (ROM), a random access memory (RAM), a backup RAM, an input/output (I/O), and any other component (none of them are illustrated in the drawings), and executes various control programs stored on the ROM to execute various processes. The controller 13 executes processes necessary to control the radio communicator 12.

The storage 14 is configured of an electronically erasable and programmable read only memory (EEPROM) that can electrically rewrite the content, for example, and the storage 14 stores programs and information necessary to control the radio communicator 12.

The IF 15 is a universal serial bus IF and any other IF, and is connected to a display, a microphone, and a speaker, or a navigation system, for example.

The card driver 16 drives an IC card referred to as a SIM card (or a UIM card), i.e., an information card. The card driver 16 may accept and reject the SIM card 17. In the case in which the card driver 16 is instructed to read or write configuration information by the controller 13, the card driver 16 reads configuration information recorded on the SIM card 17, and writes configuration information on the SIM card 17.

Generally, the SIM card is an IC card recording information that identifies a subscriber, network operator identification information that identifies a network operator, and information on services usable by the subscriber in contract, and any other information.

The SIM card 17 may be an embedded eSIM (embedded SIM). The SIM card 17 may be disposed on the outside of the radio communication module 10. The SIM card 17 may be supplied by the network operator, or may be obtained through other means. The user mounts or connects the supplied SIM card 17 to the radio communication module 10 to use the radio communication module 10.

The SIM card records configuration information necessary to receive services. For example, there are various pieces of configuration information, such as information in the registration of location information and information on a telephone number (e.g. an IVS telephone number). These pieces of information are transmitted to the management server 6 on the network 8.

Furthermore, the SIM card 17 could also be a dual SIM. A dual SIM has two SIM card slots and allows any networks corresponding to the SIM card to be used by one radio communication module or terminal. Alternatively, a dual SIM sometimes denotes an external adapter which enables the use of two SIM cards.

The operation of a radio communications system according to the present embodiment is described hereinbelow.

The radio communications system according to the present embodiment is described for the emergency call system eCall some of whose specifications are prescribed by TS24.008 (Core network protocol; stage 3) of third generation partnership project (3GPP). The controller 13 may perform an emergency call origination via a network as emergency call processing.

Here, the radio communication module 10 is in eCall only mode. eCall only mode is a dedicated mode which does not implement normal data communication functions and basically only allows eCalls. In eCall only mode, the radio communication module 10 does not perform location registration at the start of communications (cell search) with a new base station and instead performs a call origination after executing location registration when making an emergency call origination to the PSAP 7.

In the case of a mode other than eCall only mode, because location registration is completed via the base station at the time of cell search, the radio communication module 10 does not need to perform location registration when making an emergency call origination to the PSAP 7. In the case of 3GPP TS22.011, the radio communication module 10 locates an appropriate public land mobile network (PLMN) during cell search. The PLMN may be a registered PLMN (RPLMN), home PLMN (HPLMN), or an equivalent home public land mobile network (EHPLMN), for example.

Figure 3:
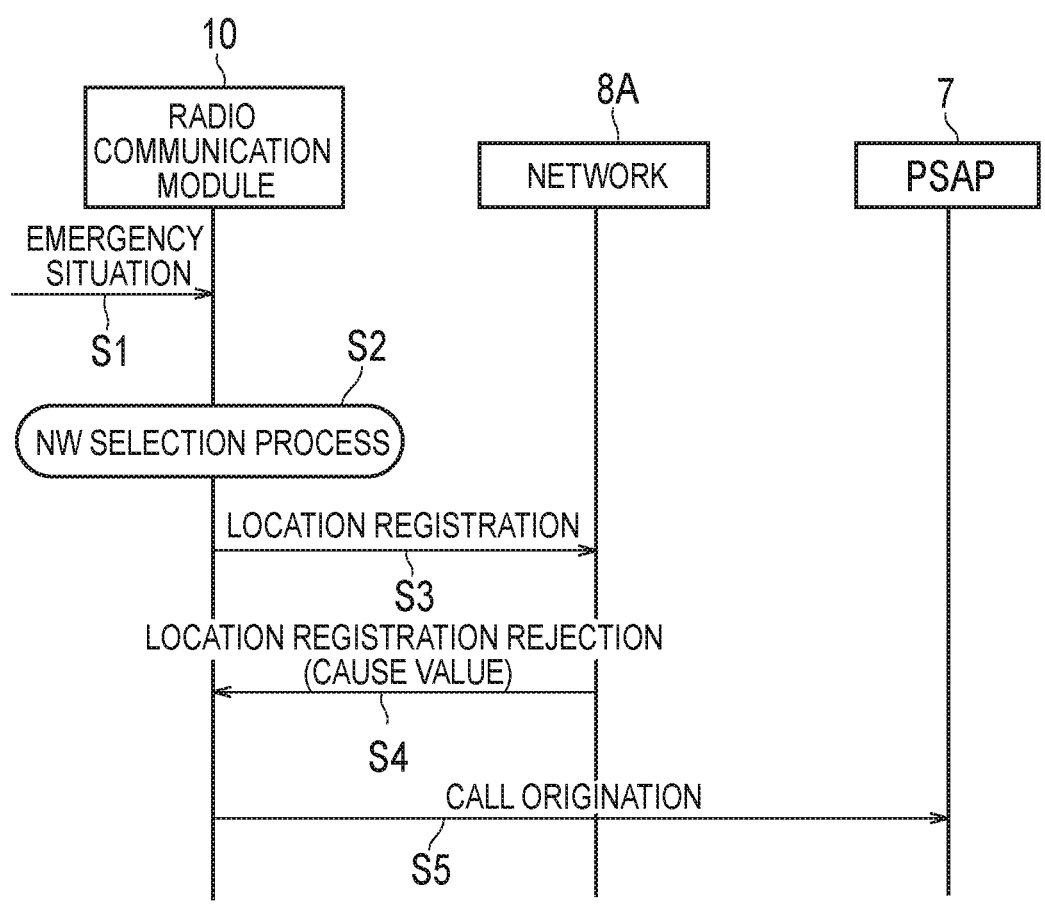
FIG. 3 is a sequence diagram representing the operation of the radio communications system according to the present embodiment.

FIG. 3 is a sequence diagram representing the operation of the radio communications system according to the present embodiment.

First, emergency situation is generated, and emergency situation event is reported to the radio communication module 10 (step S1). The emergency situation is a traffic accident or an accident or injury of a user using the radio communication module 10, but is not limited to an accident or injury in particular. The emergency situation event may be generated automatically as a result of being detected by a sensor installed on the vehicle 20 or may be generated manually as a result of the user detecting emergency situation.

The controller 13 performs an emergency call origination to the PSAP 7 upon receiving this report, but selects either network among the network 8A and network 8B (step S2). Here, suppose that the controller 13 makes a determination using the strength of reception from the closest base stations 4 on the networks 8 and the strength of reception from base station 4A closest to network 8A is strong. Thus, the selected network is then network 8A.

Thereafter, because the radio communication module 10 is in eCall only mode, the controller 13 performs location registration in the location registration management server 6 via network 8A before an emergency call origination (step S3). When location registration is rejected, the radio communication module 10 receives notification of the location registration rejection (step S4). The controller 13 is capable of finding out, from this report, a cause value when location registration has been rejected.

The controller 13 is capable of making a call origination to the PSAP 7 even when the location registration rejection report is received (step S5). Here, because the radio communication module 10 has failed to perform location registration, the radio communication module 10 is unable to report a call origination number to a communications partner via the network. Thus, the telephone number of the radio communication module 10 is not reported to the PSAP 7. In this situation, the operator of the PSAP 7 is unable to call back the radio communication module 10 of the vehicle 20 in which the emergency situation has been generated.

Incidentally, in the case of a method in which the selection of network is based only on reception strength, the results of location registration are sometimes the same. Therefore, the radio communication module 10 stores the location registration results and call origination results on the network provided by the communication carrier at the time of a call origination or cell search before the call origination, for example. Basically, the radio communication module 10 (controller 13) selects a network affording more favorable results than results of one of the plurality of networks on the basis of the stored location registration results and call origination results. The call origination partner need not be a PSAP. FIG. 4 is a table relating to location registration results and call origination results of this kind.

A network R and network S which are mapped to a record having a priority level 1 are networks for which the radio communication module 10 has succeeded in location registration and making a call origination. In the table of FIG. 4, 1 denotes the highest priority level, and 2, 3, and so forth denote priority levels in descending order. In other words, the more favorable the results afforded by a network on the basis of the stored location registration results and call origination results, the higher the priority level of the network.

A network T and network U which are mapped to priority level 2 are networks for which the radio communication module 10 has succeeded in location registration and for which a subsequent call origination has been rejected but a call origination will likely succeed by waiting for a short while. Here, rejection is, for example, a state where call originations over a network are restricted and a cause value A for the rejection (REJECT) is a value indicating "congestion", "network error", or "service option temporarily unavailable".

A network V and network W which are mapped to priority level 3 are networks for which the radio communication module 10 has been rejected in location registration which will likely succeed simply by moving a little due to area restrictions and so forth. A cause value B for the rejection (REJECT) is, for example, a value indicating "location area (LA) not permitted" or "roaming in the LA not possible".

A network X and network Y are mapped to priority level 4 and are networks for which the radio communication module 10 has been rejected in location registration and is unlikely to succeed at present because location registration is restricted over a wider area due to area restrictions and so forth. A cause value C for the rejection (REJECT) is, for example, a value indicating "PLMN not permitted".

A record for which a priority level is prohibited in FIG. 4 (hereinafter selection prohibited) has a network Z mapped to the record, and the radio communication module 10 is rejected in location registration, and a cause value D for the rejection (REJECT) is a value indicating "invalid SIM" or a value indicating "unsupported service option, not subscribed to requested service option".

Figure 5:
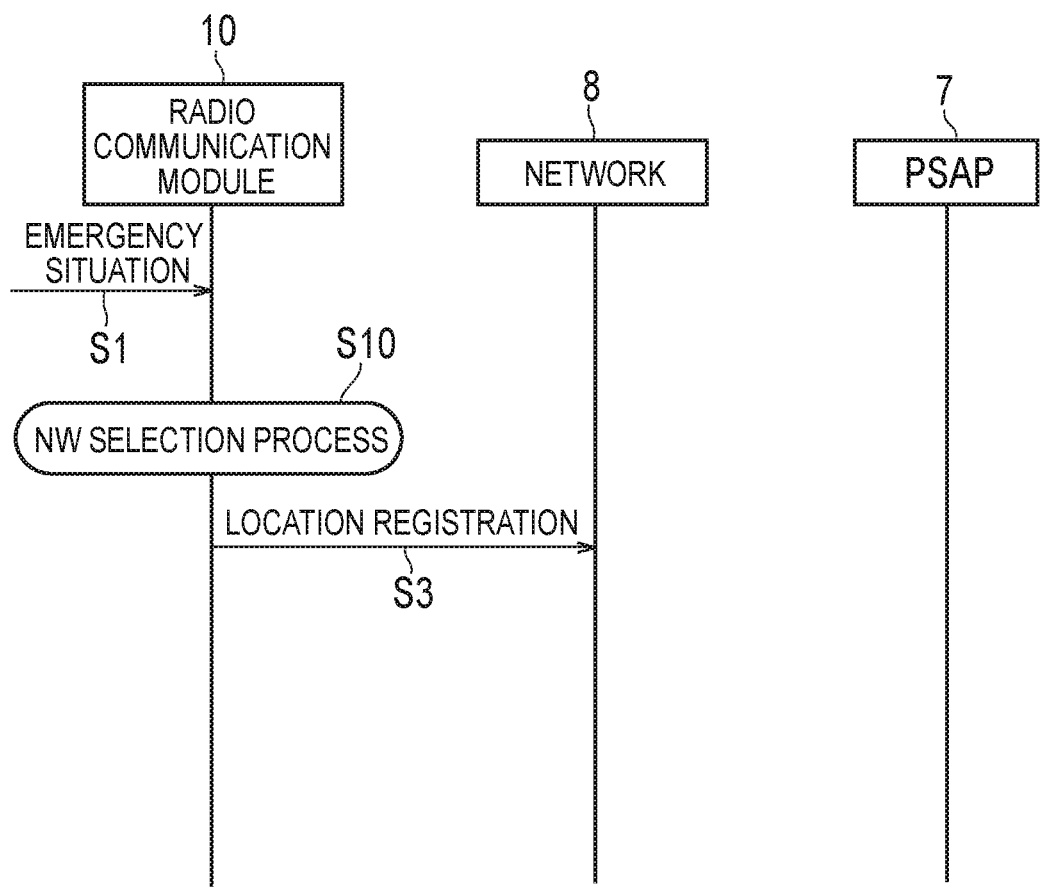
FIG. 5 is a sequence diagram representing operations of the radio communications system relating to location registration results.

FIG. 5 is a sequence diagram representing operations of the radio communications system relating to location registration results.

First, emergency situation is generated, and emergency situation event is reported to the radio communication module 10 (step S1). This is the same as step S1 described using FIG. 3.

The controller 13 performs an emergency call origination to the PSAP 7 upon receiving this report but selects a network for performing location registration (step S10). Here, the controller 13 selects the network by using previous location registration results and the like. Because the radio communication module 10 is in eCall only mode, the controller 13 performs location registration in the location registration management server 6 via the selected network prior to an emergency call origination (step S3).

Figure 6:
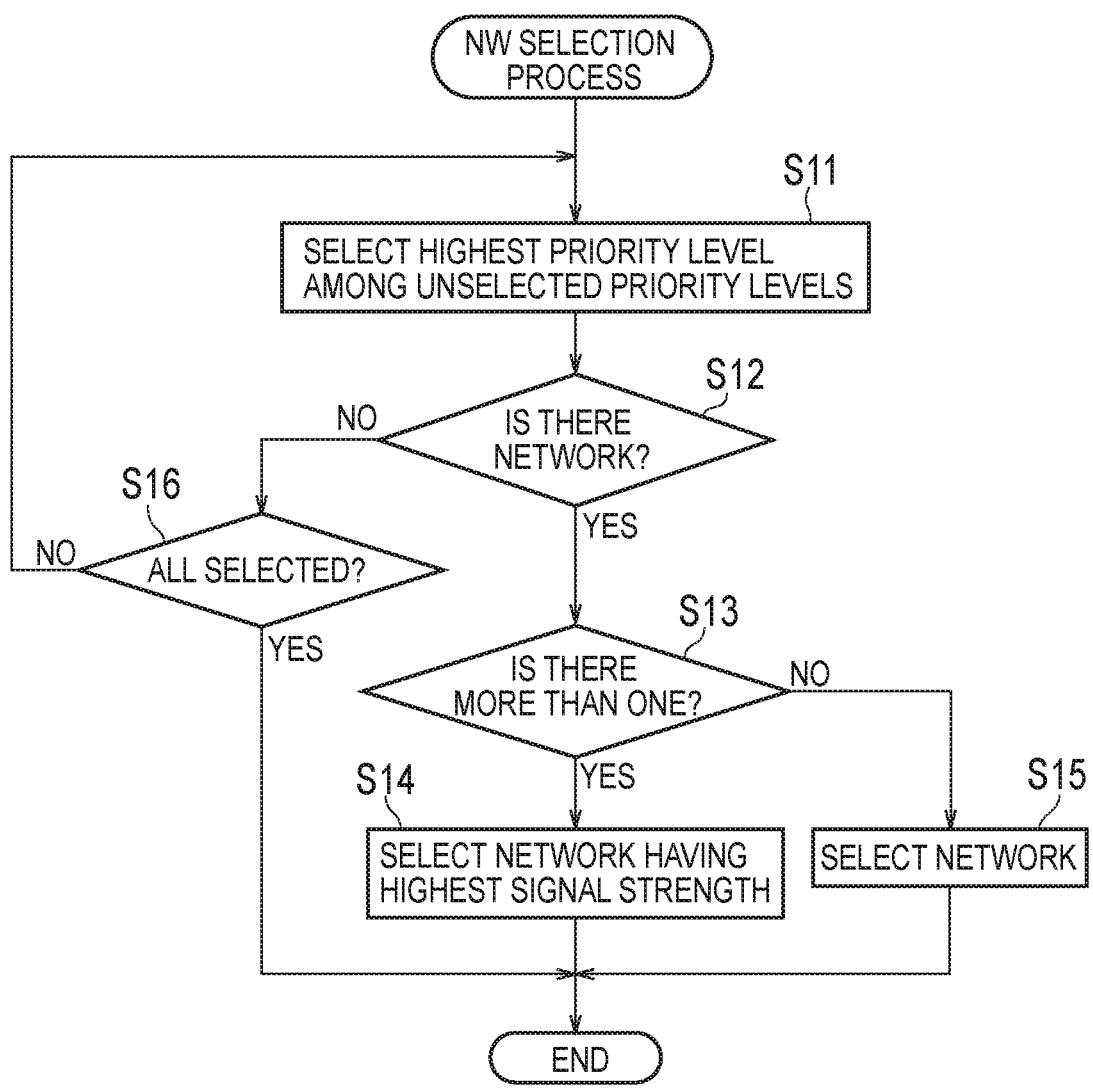
FIG. 6 is a flowchart for the network selection process in the radio communication module.

Here, details of network selection process will be described. FIG. 6 is a flowchart for the network selection process in the radio communication module 10 and illustrates the details of step S10. In the flowchart, the controller 13 selects the network by using the table relating to the location registration results described using FIG. 4.

First, the controller 13 selects the highest priority level among unselected priority levels in the table of FIG. 4 (step S11). Note that, in a state where none of the priority levels has been selected, priority level 1 is selected.

The controller 13 determines whether or not there is a network that corresponds to the selected priority level in the table in FIG. 4 (step S12), and when there is a network (step S12: YES), the controller 13 determines whether there are a plurality of networks (step S13), and when there are a plurality of networks (step S13: YES), the controller 13 selects the network with the highest strength of reception from the closest base station on the network (step S14). When there is one network (step S13: NO), the controller 13 selects the network (step S15).

When there is no network corresponding to the selected priority level (step S12: NO), the controller 13 determines whether or not all the priority levels have been selected (step S16). When all the priority levels have been selected (step S16: YES), the processing ends, and when all the priority levels have not been selected (step S16: NO), the controller 13 advances to step S11. Note that, in the table of FIG. 4, a network corresponding to the selection prohibition has not been selected.

Although described hereinabove, because the radio communication module according to the present embodiment performs network selection at the time of an emergency call origination on the basis of prior location registration results or call origination results, the radio communication module is able to perform an emergency call origination after increasing the likelihood of location registration and a call origination succeeding. Thus, the operator of the PSAP 7 is able to call back the radio communication module 10 of the vehicle 20 in which the emergency situation has been generated. Because there are also emergency call systems that attach importance to callbacks, the ability to perform a callback is important.

The radio communication module according to the present embodiment provides networks with priority levels on the basis of prior call origination results or location registration results, and because the radio communication module performs selection of a network according to the priority levels, it is possible to increase the likelihood of location registration or a call origination succeeding.

A table relating to network priority levels is provided, and the radio communication module 10 makes a network selection on the basis of this table. This table may be updated when the location registration results or call origination results at the time of an emergency call origination are determined or may be updated at the time of a normal call origination or a cell search prior to the call origination.

The priority levels in the table of FIG. 4 may also be substituted according to movement status. For example, in networks that corresponds to priority level 2 and priority level 3, because there is an increased likelihood of an emergency call origination succeeding on the network corresponding to priority level 3 when the radio communication module 10 is moving rather than when stationary, when the radio communication module 10 is moving, the radio communication module 10 may substitute the priority levels so that priority level 2 in the table of FIG. 4 is priority level 3 and priority level 3 is priority level 2. The radio communication module 10 can also be configured to not substitute the priority levels when the radio communication module 10 is not moving.

In terms of the movement status of the radio communication module 10, the controller 13 may determine the movement status from the communication state of the radio communicator 12 or may determine the movement status from speed detection means (a speedometer or speed sensor, or the like) of the vehicle 20.

On the other hand, because there is an increased likelihood of an emergency call origination succeeding on the network corresponding to priority level 2 when the radio communication module 10 is stationary rather than moving, when the radio communication module 10 is stationary, the radio communication module 10 configures priority level 2 and priority level 3 as per the table of FIG. 4 and uses the table.

In addition, regarding the network corresponding to selection prohibition in FIG. 4, the radio communication module 10 may cancel the selection prohibition when a predetermined period such as one day has elapsed, for example. When there is a network for which selection prohibition is repeated many times, the radio communication module 10 may provide a predetermined period for prohibiting network selection or may extend the period according to the repetition frequency in order to prevent a deadlock, for example.

INDUSTRIAL APPLICABILITY

The present invention enables provision, in a vehicle emergency call system, of a radio communication device and control method therefor which increase the likelihood of location registration or a call origination of the radio communication device succeeding when the radio communication device makes a call origination to an emergency call center.

The invention claimed is:

1. A radio communication device installed on a vehicle comprising:
   a radio communicator configured to perform a radio communication with a plurality of networks;
   a controller configured to perform a location registration and a call origination to Public Safety Answering Point (PSAP) via each of the plurality of networks; and
   a storage configured to store location registration results and call origination results for each of the plurality of networks,
   wherein the controller is configured to:
      for the plurality of networks, assign priorities based on the stored location registration results and call origination results;
      select a network from the plurality of networks according to the assigned priorities; and
      perform location registration at a time of an emergency call origination by using the selected network, wherein
   when assigning the priorities for the plurality of networks, the controller is configured to:
   assign a lower priority to networks on which the local registration is unsuccessful and networks on which the call origination is unsuccessful, the lower priority being lower than priorities assigned to networks on which the local registration and the call origination are successful, and
   for the networks assigned the lower priority, further assign priorities based on cause values including one or more cause values which indicate why the call origination on the networks assigned the lower priority are unsuccessful and one or more cause values which indicate why the location registration on the networks assigned the lower priority are unsuccessful,
   wherein
   when further assigning priorities for the networks assigned lower priority, the controller is further configured to assign a lower priority to a network on which the location registration result is unsuccessful and the cause value indicates that there is lower possibility for succeeding due to wider area restriction the location registration than a network on which the location registration result is unsuccessful and the cause value indicates that there is possibility for succeeding the location registration when moving.

2. The radio communication device according to claim 1, wherein
   the controller is configured to:
      determine a movement status of the radio communication device, and
      substitute the priority level according to the movement status.

3. The radio communication device according to claim 1, wherein
   the controller is configured to prohibit selection of a network depending on prior location registration results for the network.

4. The radio communication device according to claim 3, wherein
   the controller is configured to:
      provide a predetermined period for prohibiting the selection of the network, and
      cancel the prohibition when the predetermined period has elapsed.

5. The radio communication device according to claim 1, wherein,
   when there is a plurality of selected networks, the controller is configured to select a network having a strongest strength of reception from a closest base station on the network.

6. A vehicle in which the radio communication device according to claim 1 is installed.

7. A control method of a radio communication device installed on a vehicle, the radio communication device comprising:
  a radio communicator configured to perform radio communication with a plurality of networks,
  a controller configured to perform a location registration and a call origination to Public Safety Answering Point (PSAP) via each of the plurality of networks, and
  a storage configured to store location registration results and call origination results for each of the plurality of networks,
  the control method comprising:
    for the plurality of networks, assigning priorities based on the stored location registration results and call origination results;
    selecting a network from the plurality of networks according to the assigned priorities; and
    performing location registration at a time of an emergency call origination by using the selected network,
    wherein
  in the assigning the priorities, for each of the plurality of networks:
    a lower priority is assigned to networks on which the local registration is unsuccessful and networks on which the call origination is unsuccessful, the lower priority being lower than priorities assigned to networks on which the local registration and the call origination are successful; and
    priorities are further assigned to the networks assigned lower priority based on cause values including one or more cause values which indicate why the call origination on the networks assigned the lower priority are unsuccessful and one or more cause values which indicate why the location registration on the networks assigned the lower priority are unsuccessful,
  wherein
    when further assigning priorities for the networks assigned lower priority, the control method further assigns a lower priority to a network on which the location registration result is unsuccessful and the cause value indicates that there is lower possibility for succeeding due to wider area restriction the location registration than a network on which the location registration result is unsuccessful and the cause value indicates that there is possibility for succeeding the location registration when moving.

8. The radio communication device according to claim 1, wherein,
  when further assigning priorities for the networks assigned lower priority, the controller is further configured to assign a lower priority to a network on which the location registration result is unsuccessful and the cause value indicates that there is possibility for succeeding the location registration when moving, than a network on which the location registration result is successful and the call origination result is unsuccessful.

9. The radio communication device according to claim 1, wherein,
  a cause value, which indicates why the call origination on the networks assigned the lower priority is unsuccessful, indicates at least one of congestion, network error and service option temporarily unavailable.

* * * * *